(12) United States Patent
Cherkasova et al.

(10) Patent No.: US 8,255,910 B2
(45) Date of Patent: Aug. 28, 2012

(54) FAIR WEIGHTED PROPORTIONAL-SHARE VIRTUAL TIME SCHEDULER

(75) Inventors: Ludmila Cherkasova, Fort Collins, CO (US); Diwaker Gupta, Fort Collins, CO (US); Robert D. Gardner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1806 days.

(21) Appl. No.: 11/488,399

(22) Filed: Jul. 18, 2006

(65) Prior Publication Data

US 2008/0022280 A1    Jan. 24, 2008

(51) Int. Cl.
G06F 9/46    (2006.01)
H04L 12/28    (2006.01)

(52) U.S. Cl. ...................... 718/102; 718/107; 370/395.4

(58) Field of Classification Search ........................ None
See application file for complete search history.

(56) References Cited

U.S. PATENT DOCUMENTS

| 7,065,762 | B1 * | 6/2006 | Duda et al. ................... 718/102 |
| 2005/0097553 | A1 * | 5/2005 | Smith et al. ................... 718/100 |
| 2006/0200819 | A1 * | 9/2006 | Cherkasova et al. .............. 718/1 |
| 2007/0150898 | A1 * | 6/2007 | Duda et al. ................... 718/104 |

OTHER PUBLICATIONS

Jefferson, D. "Virtual Time", ACM Transactions on Programming Languages and Systems, vol. 7, No. 3, Jul. 1985, pp. 404-425.
Duda, K. et al., "Borrowed-virtual-time (BVT) scheduling: Supporting latency-sensitive threads in a general purpose scheduler"; In Proc. of 17th Symposium on Operating Systems Principles, Dec. 1999; 16 pages.

* cited by examiner

*Primary Examiner* — Emerson Puente
*Assistant Examiner* — Adam Lee

(57) ABSTRACT

A method comprises scheduling, by a weighted proportional-share virtual time processor scheduler, processor access to a first consumer during a time period in which a second consumer is blocked from processor access. When the second consumer becomes unblocked from processor access, the weighted proportional-share virtual time processor scheduler determines whether the length of the time period over which the second consumer was blocked from processor access exceeds a predefined time threshold. When determined that the length of the time period over which the second consumer was blocked from processor access does not exceed the predefined time threshold, then scheduler does not update the virtual time of the second consumer before scheduling processor access for the second consumer.

17 Claims, 7 Drawing Sheets

WEIGHTED PROPORTIONAL-SHARE VIRTUAL TIME PROCESSOR SCHEDULER SCHEDULES RESOURCE ACCESS IN A VIRTUAL TIME SLICES TO A FIRST CONSUMER DURING A PERIOD IN WHICH A SECOND CONSUMER IS BLOCKED FROM PROCESSOR ACCESS — 301

WHEN THE SECOND CONSUMER BECOMES UNBLOCKED, DETERMINING WHETHER A DIFFERENCE IN VIRTUAL TIME OF THE FIRST CONSUMER AND VIRTUAL TIME OF THE SECOND CONSUMER EXCEEDS A PREDEFINED TIME THRESHOLD WINDOW — 302

WHEN DETERMINED THAT THE DIFFERENCE DOES NOT EXCEED THE PREDEFINED TIME THRESHOLD WINDOW, THEN THE SECOND CONSUMER'S VIRTUAL TIME IS NOT UPDATED TO THAT OF THE FIRST CONSUMER — 303

WHEN DETERMINED THAT THE DIFFERENCE DOES EXCEED THE PREDEFINED TIME THRESHOLD WINDOW THRESHOLD WINDOW, THEN THE SECOND CONSUMER'S VIRTUAL TIME IS UPDATED TO THAT OF THE FIRST CONSUMER — 304

FIG. 2

- WEIGHTED PROPORTIONAL-SHARE VIRTUAL TIME PROCESSOR SCHEDULER SCHEDULES PROCESSOR ACCESS TO A FIRST CONSUMER DURING A PERIOD IN WHICH A SECOND CONSUMER IS BLOCKED FROM PROCESSOR ACCESS — 201
- WHEN THE SECOND CONSUMER BECOMES UNBLOCKED, THE WEIGHTED PROPORTIONAL-SHARE VIRTUAL TIME SCHEDULER DETERMINES WHETHER THE PERIOD OVER WHICH THE SECOND CONSUMER WAS BLOCKED EXCEEDS A PREDEFINED TIME THRESHOLD — 202
- IF THE PREDEFINED TIME THRESHOLD IS NOT EXCEEDED, THEN THE WEIGHTED PROPORTIONAL-SHARE VIRTUAL TIME PROCESSOR SCHEDULER MAINTAINS PROPORTIONALITY IN SCHEDULING ACCESS TO THE PROCESSOR BASED ON RELATIVE WEIGHTS ASSIGNED TO THE FIRST AND SECOND CONSUMERS — 203

FIG. 3

- WEIGHTED PROPORTIONAL-SHARE VIRTUAL TIME PROCESSOR SCHEDULER SCHEDULES RESOURCE ACCESS IN A VIRTUAL TIME SLICES TO A FIRST CONSUMER DURING A PERIOD IN WHICH A SECOND CONSUMER IS BLOCKED FROM PROCESSOR ACCESS — 301
- WHEN THE SECOND CONSUMER BECOMES UNBLOCKED, DETERMINING WHETHER A DIFFERENCE IN VIRTUAL TIME OF THE FIRST CONSUMER AND VIRTUAL TIME OF THE SECOND CONSUMER EXCEEDS A PREDEFINED TIME THRESHOLD WINDOW — 302
- WHEN DETERMINED THAT THE DIFFERENCE DOES NOT EXCEED THE PREDEFINED TIME THRESHOLD WINDOW, THEN THE SECOND CONSUMER'S VIRTUAL TIME IS NOT UPDATED TO THAT OF THE FIRST CONSUMER — 303
- WHEN DETERMINED THAT THE DIFFERENCE DOES EXCEED THE PREDEFINED TIME THRESHOLD WINDOW THRESHOLD WINDOW, THEN THE SECOND CONSUMER'S VIRTUAL TIME IS UPDATED TO THAT OF THE FIRST CONSUMER — 304

FAIR WEIGHTED PROPORTIONAL-SHARE VIRTUAL TIME SCHEDULER

FIELD OF THE INVENTION

The following description is related generally to resource scheduling, and more particularly to a proportional-share scheduler for scheduling access by competing consumers to shared resources in a manner that maintains fairness.

DESCRIPTION OF RELATED ART

Resource pools are collections of computing resources, such as clusters of servers, racks of blades, or other computing resources. The utility data center (UDC) available from Hewlett-Packard Company is one example of a resource pool. Depending on the granularity of a given implementation, a resource pool may be a collection of separate computing devices (e.g., separate servers, separate clusters of servers, etc.) or it may be a collection of resources on a common computing device (e.g., multiple processors on a single server). Various types of resource pools are known, and techniques have been developed for managing access to such resource pools. For instance, virtualization services have been developed that offer interfaces that support the lifecycle management (e.g., create, destroy, move, size capacity) of resource containers (e.g., virtual machines, virtual disks) that provide access to shares of capacity. Various consumers (e.g., applications) may share access to the resources of a resource pool. That is, various consumers may share utilization of the resources in a resource pool for servicing their respective workloads. In this sense, a "consumer" refers to anything (e.g., process, etc.) that consumes capacity of the pool's resources. A consumer generally consumes capacity for use in servicing the consumer's workload. Thus, the consumer has a "demand" for capacity from the resource pool for servicing its workload in a desired manner. In some implementations, workloads are assigned to the resource containers which are then associated with resources. A "processor resource," as used herein, refers to any computing resource now known or later developed that a consumer utilizes in servicing a workload, including without limitation central processing unit(s) (CPU(s)).

To facilitate sharing of a resource pool's capacity between a plurality of consumers (e.g., a plurality of applications), some type of scheme for managing allocation of the pool's capacity among the consumers may be employed. Without such management of allocation, a given consumer may consume all or substantially all of the pool's capacity for servicing its workload, thus leaving the remaining consumers with insufficient capacity for supporting their respective workloads. Accordingly, consumers generally desire some assurance that they will be allocated sufficient capacity of the resource pool to enable the consumers to satisfy their respective quality of service (QoS) goals. As discussed further below, schedulers may be configured to allocate capacity of a resource pool among the consumers in an attempt to manage such allocation in a manner that provides some assurance that the consumers can satisfy their QoS goals (e.g., by balancing allocation among the consumers).

Each resource in a pool may have a processor scheduler that monitors its workloads' demands and dynamically varies the allocation of processor capacity, e.g., CPU, to the workloads, thereby managing the utilization of the processor resources by the various consumers. For instance, the scheduler may dynamically vary allocation of the processor's capacity in a manner that attempts to provide each consumer with access only to the capacity it needs (for servicing its current workload). As a workload's demand increases, the scheduler may increase the amount of the processor's capacity that is allocated to such workload; and as a workload's demand decreases, the scheduler may decrease its allocation of the processor's capacity to such workload.

Schedulers are well known for scheduling access to shared processor resources for competing consumers. Virtual time is a well-known concept in computing systems. Certain processor (e.g., CPU) schedulers have been developed that base their scheduling operations at least in part on virtual time. Such schedulers that use virtual time for performing scheduling are referred to herein as virtual time processor schedulers. An example of a known virtual time processor scheduler is the Borrowed Virtual Time (BVT) scheduler, which is a weighted proportional-share virtual time processor scheduler. Such BVT scheduler can be used, for example, for scheduling access to a CPU by different threads or processes in a conventional operating system. The BVT scheduler can additionally or alternatively be used for scheduling CPU access for virtual machines that run on a shared physical host. Techniques for implementing virtual machines on a system are also well known. Similar to the way that a general-purpose OS presents the appearance to multiple applications that each has unrestricted access to a set of computing resources, a virtual machine manages a system's physical resources and presents them to one or more OSs, thus creating for each OS the illusion that it has full access to the physical resources that have been made visible to it. The current trend toward virtualized computing resources and outsourced service delivery has caused interest to surge in Virtual Machine Monitors (VMMs) that enable diverse applications to run in isolated environments on a shared hardware platform. A VMM is a layer of software that runs on a host platform and provides an abstraction of a complete computer system to higher-level software. That is, a VMM, which may also be referred to as a "hypervisor," is a software layer that virtualizes the available resources of a computer and multiplexes them among one or more guest OSs on the computer system. Many such VMMs are available in the art, such as the VMM known as Vmware™ available from VMware, Inc. An abstraction created by VMM is called a virtual machine (VM). Accordingly, a VMM aids in subdividing the ample resources of a modern computer and creating the illusion of multiple virtual machines each running a separate OS instance. The BVT has been used, for example, by the Xen™VMM available from Hewlett-Packard Company, wherein BVT schedules the access to CPU by different virtual machines (which may be referred to as "domains").

The classic BVT scheduler is based on the virtual time concept, dispatching the runnable thread/virtual machine with the earliest virtual time for CPU access first. It provides weighted proportional-sharing of CPU among the competing tasks on a low time scale granularity (e.g. milliseconds). However, traditional proportional-share virtual time schedulers, such as the classic BVT scheduler, are undesirably unfair in their scheduling in certain situations, particularly in situations in scheduling access to a shared processor for competing consumers in which one consumer is a blocked-intensive consumer and another consumer is a processor usage-intensive consumer. As used herein, blocked-intensive consumers refer to those consumers that are blocked for periods of time from using a shared processor. An example of a blocked-intensive consumer is an input/output (I/O)-intensive consumer because such consumer is often blocked from using the processor while awaiting I/O tasks. As used herein, processor usage-intensive consumers refer to those consumers that are not blocked from using the shared processor, i.e., can use the processor during periods of a blocked-intensive consumer being blocked from using the shared processor. It should be recognized that in some systems a given consumer may be considered a blocked-intensive consumer at certain times of its operation (e.g., when performing I/O-intensive tasks) and may be considered a processor usage-intensive consumer at other times of its operation (e.g., when performing tasks that use uninterrupted access of the shared processor).

In virtual time processor schedulers, the virtual time of blocked consumers is updated from time to time to ensure that these blocked consumers do not accumulate a very large amount of "credits" for future processor usage. The unfairness occurs in proportional-share virtual time processor schedulers, such as BVT, during such virtual time updates. As an example, consider a system in which a BVT scheduler schedules access to a CPU by an I/O-intensive consumer and a CPU usage-intensive consumer. In this example, the CPU is the shared processor, and the I/O-intensive consumer is a blocked-intensive consumer (as its usage of the CPU is blocked more often than is usage of the CPU by the CPU usage-intensive consumer). The BVT scheduler is unfair in its scheduling for the I/O-intensive tasks in the presence of CPU-intensive tasks on a longer time scale (e.g. seconds) than the scheduling interval time scale (e.g. milliseconds). In the classic BVT scheduler, for example, the virtual time of the I/O-intensive tasks that are often blocked on I/O-related interrupts gets updated after wakeup (i.e. after becoming unblocked) to a minimum virtual time of currently running domains, and it leads to a "stolen" CPU share for I/O-intensive tasks when they compete against the CPU-intensive tasks. In such a way, an access to CPU for I/O-intensive tasks gets delayed and results in a smaller CPU amount allocated to I/O-intensive tasks compared to CPU-intensive tasks over time, and it leads to a degraded performance of the I/O-intensive consumer. Thus, a desire exists for an improved proportional-share virtual time processor scheduler that maintains fairness, particularly when scheduling access to a shared processor by both blocked-intensive consumers and processor usage-intensive consumers.

BRIEF DESCRIPTION OF THE DRAWINGS

FIG. 2 shows an operational flow diagram according to one embodiment of the present invention;

FIG. 3 shows an operational flow diagram according to another embodiment of the present invention;

DETAILED DESCRIPTION OF THE INVENTION

Figure 1:
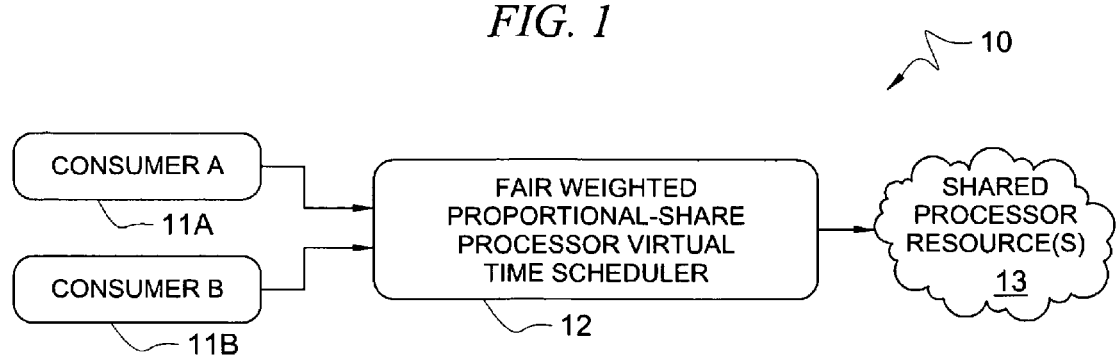
FIG. 1 shows a block diagram of an exemplary system according to one embodiment of the present invention.

FIG. 1 shows a block diagram of an exemplary system 10 according to one embodiment of the present invention. System 10 comprises a fair weighted proportional-share virtual time processor scheduler 12, embodiments of which are described further herein. Scheduler 12 schedules access to shared processor resource(s) 13 for competing consumers 11A and 11B. Shared processor resource(s) 13 may be any type of resource(s) for processing a consumer's workload, such as a central processing unit (CPU). Thus, as used herein, "processor resource" or simply "processor" each refers to any type of processing resource, including without limitation one or more CPUs, microprocessors, and/or other logic for processing instructions for servicing a consumers workload. Such shared processor resource(s) 13 have limited capacity, and scheduler 12 thus schedules access to such limited capacity by the consumers 11A-11B.

Thus, consumers 11A-11B may share utilization of the processor resource(s) 13 for servicing their respective workloads. In this sense, a "consumer" refers to anything (e.g., process, etc.) that consumes capacity of the shared processor resource(s) 13. A consumer generally consumes capacity for use in servicing the consumer's workload. Thus, the consumer has a "demand" for capacity from the shared processor resource(s) 13 for servicing its workload in a desired manner. In certain embodiments, the consumers are applications (or processes) demanding access to a shared CPU resource. In other embodiments, the consumers are virtual machines (or domains) of a system that are demanding access to a shared CPU resource. While two consumers are shown for ease of illustration in this example, it should be appreciated that any number of competing consumers may be included on system 10 at any given time. In certain embodiments, scheduler 12 is a weighted proportional-share scheduler that schedules access to shared processor resource(s) 13 for the competing consumers 11A-11B in proportion to relative weights assigned to each consumer. Of course, the consumers may have equal weights in certain embodiments.

As described further herein, embodiments of the present invention provide a weighted proportional-share virtual time processor scheduler 12 that improves fairness in its scheduling of access to a shared processor between various competing consumers (e.g., in proportion to their respective weights), particularly between blocked-intensive consumers and processor usage-intensive consumers. One embodiment of the present invention provides a modification to the well-known BVT scheduler that improves its fairness in scheduling processor access for blocked-intensive consumers in the presence of processor usage-intensive consumers.

As described in further detail below, virtual time processor schedulers, such as BVT, schedule access to a processor for consumers in virtual time slices that are in proportion to the consumers' relative weights. The time slices (or "scheduling intervals") may each have relative fine time granularity, e.g., microseconds. Consider, for example, two competing consumers that are each currently runnable and each have equal weights, the scheduler may schedule a 100 microsecond time slice to the first consumer and then a 100 microsecond time slice to the second consumer. From time-to-time, a consumer may become blocked such that it is unable to use the processor. Thus, if the first consumer is blocked for 500 microseconds, the scheduler may schedule access to the processor for the second consumer for 5 consecutive 100-microsecond time slices. To maintain proportionality between the consumers, the first consumer should then be entitled to receive 5 consecutive 100-microsecond time slices once it becomes unblocked. As can be seen, maintaining such proportionality can become problematic if the first consumer is blocked for a long period of time, as it may then monopolize an undesirably large number of time slices when it becomes unblocked. To prevent such first consumer from consuming an excessive number of time slices when it becomes unblocked, the traditional virtual time processor schedulers, such as the classic BVT scheduler, updates the first consumer's virtual time to the actual virtual time of the second consumer that has been using the processor during the time that the first consumer was blocked. As such, in the above example in which the first consumer is blocked for 5 time slices, the first consumer is not provided those 5 time slices upon becoming unblocked, but instead the scheduler advances the first consumer's virtual time to that of the second consumer. Thus, if the first consumer is blocked-intensive and the second consumer is processor usage-intensive, the second consumer gets allocated disproportionately more access (e.g., more time slices) to the processor.

While it is generally desirable to prevent a consumer that has been blocked for a long period of time from consuming an excessive number of scheduling time slices, it may be desirable to enable fairness in the scheduling to be maintained over a defined time threshold (e.g., a moving time window). For instance, it may be desirable to allow for the proportionality in scheduling to be maintained over, say, a 1-second time threshold, wherein if a blocked consumer becomes unblocked within such 1-second time threshold then the scheduler allows the consumer sufficient access to the processor to maintain fairness. Accordingly, if, as in the above example, the first consumer is blocked for 500 microseconds, the scheduler may schedule access to the processor for the second consumer for 5 consecutive 100-microsecond time slices while the first consumer is blocked; but because the first consumer becomes unblocked within the 1-second threshold, the scheduler may then schedule 5 consecutive 100-microsecond time slices to the first consumer to maintain proportionality between the consumers over the 1-second threshold.

Thus, embodiments of the present invention provide a weighted proportional-share virtual time processor scheduler which allows for a threshold time interval during which a consumer can become unblocked and receive its proportionate share of access to the processor. For instance, in certain embodiments a threshold time interval having coarser granularity than the scheduling intervals (time slices) may be used to enable a consumer that is unblocked during such threshold time interval to receive its proportional share of access to the processor. Thus, fairness in scheduling can be maintained over the coarser time granularity (e.g., over the 1-second time interval in the above example).

Turning to FIG. 2, an operational flow diagram according to one embodiment of the present invention is shown. In operational block 201, a weighted proportional-share virtual time processor scheduler 12 schedules resource access to a first consumer (e.g., consumer 11A of FIG. 1) during a period in which a second consumer (e.g., consumer 11B of FIG. 1) is blocked from processor (e.g., CPU) access. In block 202, when the second consumer becomes unblocked, the weighted proportional-share virtual time processor scheduler determines whether the period over which the second consumer was blocked exceeds a predefined time threshold. For example, a predefined time threshold of 1 second may be implemented, wherein the scheduler determines whether the second consumer was blocked for longer than the 1-second threshold. In block 203, if the predefined time threshold is not exceeded, then the weighted proportional-share virtual time processor scheduler maintains proportionality in scheduling access to the processor based on relative weights assigned to the first and second consumers. That is, the virtual time of the second consumer is not updated to that of the first consumer if the second consumer is not blocked for longer than the predefined time threshold.

According to certain embodiments, a weighted proportional-share virtual time processor scheduler 12 is implemented as to enforce a predefined threshold time unit (e.g., 1-second) in which it does not update the actual virtual time of consumers (e.g., domains) to the system virtual times. Instead, the scheduler permits the virtual time of blocked consumers to lag through the predefined threshold time interval. In this manner, the scheduler ensures fair (in proportion to the relative weights) scheduling of access by the competing consumers to a shared processor resource (e.g., CPU) through the predefined threshold time interval (e.g., 1-second window). So, if the real time from when a consumer becomes blocked and gets unblocked is less than the predefined threshold time interval (e.g., 1 second), then in one embodiment the scheduler 12 does not update the consumer's virtual time. In certain embodiments, the predefined threshold time interval is implemented as a moving window (e.g., that starts at any time $T_{bl}$ that a consumer gets blocked). Therefore, the scheduler is still capable of updating the consumer's virtual time when the consumer is blocked for a period that exceeds the predefined threshold time interval.

FIG. 3 shows an operational flow diagram according to one embodiment of the present invention. In operational block 301, the weighted proportional-share virtual time processor scheduler 12 schedules processor access in virtual time slices to a first consumer during a period in which a second consumer is blocked from processor access. In block 302, when the second consumer becomes unblocked, the weighted proportional-share virtual time processor scheduler 12 determines whether a difference in virtual of the first consumer and virtual time of the second consumer exceeds a predefined time threshold window. In block 303, when determined that the difference does not exceed the predefined time threshold window, then the second consumer's virtual time is not updated to that of the first consumer. In block 304, when determined that the difference does exceed the predefined time threshold window, then the second consumer's virtual time is updated to that of the first consumer.

One embodiment of the present invention modifies the classic BVT scheduler to improve its scheduling fairness, particularly as between blocked-intensive consumers and processor usage-intensive consumers. To better understand this exemplary embodiment, it is appropriate to first describe the classic BVT algorithm. The classic BVT algorithm is well known and is further described, for example, by K. Duda and D. Cheriton in "Borrowed-virtual-time (BVT) scheduling: Supporting latency-sensitive threads in a general purpose scheduler", *In Proc. of* 17*th Symposium on Operating Sys-* tems Principles, December 1999, the disclosure of which is hereby incorporated herein by reference. The classic BVT scheduling algorithm is briefly described herein using the following notation:

$Dom_i$—the domain (virtual machine) i;

$weight_i$—weight of domain $Dom_i$;

$warpBack_i$—warp parameter of $Dom_i$, that defines whether domain $Dom_i$ has warp "on" or "off": a) warp is set "on" for $Dom_i$ if $warpBack_i=1$, and warp is set "off" for $Dom_i$ if $warpBack_i=0$;

$W_i$—is a value for $Dom_i$ warping back if warp is set to "on" value. Time units for $W_i$ are virtual time units;

$L_i$—is a warp time limit requirement for how long $Dom_i$ is allowed to use CPU in a warp mode. $L_i$ is defined in real time units;

$U_i$—is a warp time limit requirement for how long $Dom_i$ is allowed to use CPU in a warp mode;

$A_i$—actual virtual time (avt) of $Dom_i$. Because $A_i$ is the actual virtual time of $Dom_i$ that corresponds to real time T, we sometimes use denotation $A_i(T)$; and $E_i$—effective virtual time (evt) of $Dom_i$. If the warp parameter is off, i.e. $W_i=0$, then the effective virtual time coincides with the actual virtual time: $E_i=A_i$. If the warp parameter is on, i.e. $W_i=1$, then: $E_i=A_i-W_i$.

The classic BVT algorithm may be used, for example, by a VMM for scheduling access by competing domains to a CPU of a system. For scheduling purposes in such an implementation, each domain $Dom_i$ is represented by tuple: ($weight_i$, $warpBack_i$, $W_i$, $L_i$, $U_i$, $A_i$, $E_i$). The BVT scheduler accounts for running time in units of minimum charging unit (mcu), typically the frequency of clock interrupts. A domain that runs for T microseconds has this amount rounded up to the closest k×mcu and is then charged for k time units. For instance, suppose mcu=100 microseconds and a domain runs for 290 microseconds, the domain is charged for 300 microseconds of usage. The scheduler is configured with a context switch allowance ("C"), which is the real time by which the current thread is allowed to advance beyond another runnable thread with equal claim on the CPU. C is typically some multiple of mcu. For example, a BVT scheduler could use C=5 milliseconds and mcu=100 microseconds; wherein each runnable thread is charged a minimum of 100 microseconds when it is using the CPU, and a current running thread is allowed to advance up to 5 milliseconds beyond another runnable thread with equal claim on the CPU. C in the BVT scheduler is similar to the quantum in conventional time sharing.

Each runnable domain receives a share of CPU in proportion to its weight $weight_i$. To achieve this, the avt (i.e., $A_i$) of the currently running $Dom_i$ is incremented by its running time divided by $weight_i$. On each avt update, the scheduler switches from current $Dom_i$ to runnable $Dom_j$ if $A_j \leq A_i - C/weight_i$ (referred to herein as "equation (1)"). The avt update in real time $T_{cur}$ is caused by the following state change:

at time T, the current $Dom_i$ has either exhausted its time slice or has been blocked prior to exhausting its time slice; and at time T, there is a newly woken up $Dom_j$, i.e. there is domain $Dom_j$ that has been unblocked and thus has to be inserted in the run queue.

Suppose that $Dom_j$ becomes blocked in time $T_{bl}$ with avt at that moment equal to $A_j(T_{bl})$. When domain $Dom_j$ becomes runnable after sleeping (i.e. after being blocked) at time $T_{cur}$, its avt is updated according to the following rule ("equation (2)"):

$A_j(T_{cur})=\max(A_j(T_{bl})), SVT)$, where the scheduler virtual time SVT is defined as a minimal avt of any runnable domain, i.e. ("equation (3)"):

$SVT=\min(A_i(T_{cur}))$ such that $Dom_i$ is runnable at $T_{cur}$.

This adjustment is done to prevent the domain from claiming an excessive share of CPU after being blocked (e.g., sleeping) for a long time. With this adjustment, a domain gets the same share of CPU on wakeup as any other runnable domain because it is given the same avt in both cases.

The classic BVT scheduler becomes unfair in certain situations, particularly when it is scheduling access to a shared processor resource (e.g., CPU) for both a blocked-intensive consumer and a processor usage-intensive consumer. To illustrate an exemplary situation in which such unfairness arises, let us consider the scenario with two domains $Dom_1$ and $Dom_2$, where $Dom_1$ is an I/O-intensive domain and $Dom_2$ is a CPU usage-intensive domain. Further suppose that both domains $Dom_1$ and $Dom_2$ have the same weight, which means that they both are entitled to the same share of CPU allocation over time.

$Dom_2$, in this example, is a CPU usage-intensive domain that always has work to do (i.e., is not blocked from usage of the CPU), and $Dom_1$ is an I/O-intensive domain, such as a domain executing a web server application, which is often blocked even under very high load due to incoming network interrupts processed by a network driver (e.g., requests to a web server) and due to necessity of sending replies over the network back to the clients that causes $Dom_1$ to be blocked while the network driver is sending the replies.

Under the classic BVT scheduler described above, the CPU usage-intensive domain $Dom_2$ is typically scheduled at time T and runs for the entire duration of time slice $T_{slice}$ that is allocated to this domain. In such a way, at the end of time slice $T_{slice}$ that corresponds to time $T_{next}=T+T_{slice}$ the actual virtual time of domain $Dom_2$ is updated to:

$A_2(T_{next})=A_2(T)+T_{slice}/weight_2$.

If domain $Dom_1$ was blocked at time T and becomes unblocked at time $T_{next}$, its actual virtual time will be updated according to equation (2) as:

$A_1(T_{next})=\max(A_i(T_{next}), SVT)$, where the scheduler virtual time SVT is defined as a minimal avt of any runnable domain at time $T_{next}$ according to equation (3). Since $Dom_2$ was the only runnable domain in this interval: $SVT=A_2(T_{next})$. Thus, $Dom_1$ is added to the set of runnable domains (e.g., in a run queue) with the SVT being updated to $A_2(T_{next})$.

In such a way, $Dom_1$ is losing its entitlement for a CPU share equivalent to $T_{slice}$ while being blocked, and at the same time, $Dom_2$ is continuously receiving an extra CPU share. This is because on domain $Dom_1$ becoming unblocked the actual virtual time of domain $Dom_1$ is updated to the actual virtual time of $Dom_2$ and the BVT scheduler will not switch to execute $Dom_1$ (see equation (1)), but will continue executing $Dom_2$ until its currently allocated time slice is finished.

Figure 4A:
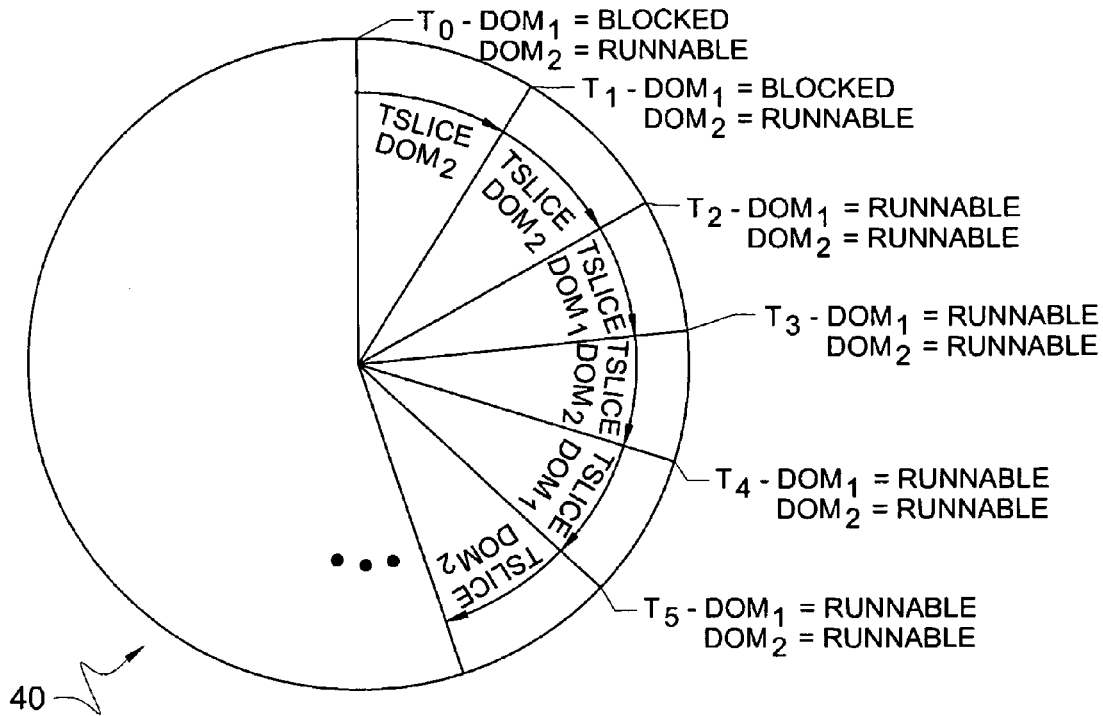
FIG. 4A shows a pie chart illustrating an exemplary scenario for scheduling performed by a classic BVT scheduler.

FIG. 4A shows a pie chart 40 illustrating an exemplary scenario for scheduling performed by a classic BVT scheduler for this scenario, which illustrates the unfairness of such scheduling to the blocked-intensive (e.g., I/O-intensive) domain, $Dom_1$. To simplify this illustration, the context switch allowance, C, is ignored, i.e. let C=0. Again, both domains $Dom_1$ and $Dom_2$ have the same weight, which means that they both are entitled to the same share of CPU allocation over time. In the example shown in FIG. 4A, at time $T_0$ $Dom_1$ is blocked and $Dom_2$ is runnable. In this example, at time $T_0$ the actual virtual time $A_1$ of $Dom_1$ is $A_1=T_0$, and the actual virtual time $A_2$ of $Dom_2$ is $A_2=T_0$. The classic BVT scheduler schedules $T_{slice}$ (e.g., 100 microseconds) to $Dom_1$.

At time $T_1$, $Dom_1$ remains blocked and $Dom_2$ remains runnable. Thus, the classic BVT scheduler schedules another $T_{slice}$ (e.g., 100 microseconds) to $Dom_1$. At time $T_2$, domain $Dom_1$ has become unblocked, and thus its actual virtual time is updated by the classic BVT scheduler according to equations (2) and (3) above to the minimal avt of any runnable domain at time $T_2$, and thus because $Dom_2$ was the only runnable domain in this interval, the actual virtual time of $Dom_1$ is updated to the avt of $Dom_2$, i.e. $A=A_2=T_2$. Thereafter, the classic BVT scheduler schedules proportional shares (e.g., equal time slices in this example since the domains have equal weights) to each of $Dom_1$ and $Dom_2$. However, $Dom_1$ is not allocated sufficient time slices to make up for the disproportionality that arose while it was blocked. In this example, $Dom_2$ received an extra time slice (e.g., the time slice from time $T_1$ to $T_2$), and because $Dom_1$'s actual virtual time was updated after being unblocked to $A_1=T_2$, the scheduling of resource access to $Dom_1$ is not fairly proportioned to that of $Dom_2$ in accordance with their respective weightings (which are equal in this example).

Experiments with CPU usage-intensive applications and I/O-intensive applications (e.g., disk or web server I/Os) show that while a domain running an I/O-intensive application (e.g., web server application) under a high request rate seems to always have "work to do", it receives much smaller CPU share than the CPU usage-intensive domain under the classic BVT scheduler.

While the classic BVT scheduler justifies actual virtual time adjustment of a blocked (e.g., sleeping) domain by the aim of preventing the domain from claiming excessive share of CPU once becoming unblocked (e.g., waking) after being blocked for a long time, a desire exists for an improved scheduling technique that provides a more controllable framework on when and by how much such avt adjustment should be done. According to certain embodiments, a time threshold is defined, wherein if a blocked consumer (e.g., domain) becomes unblocked before exceeding such time threshold, then the consumer's actual virtual time is not updated, thus enabling proportionality between the competing consumers to be maintained fairly.

Figure 4B:
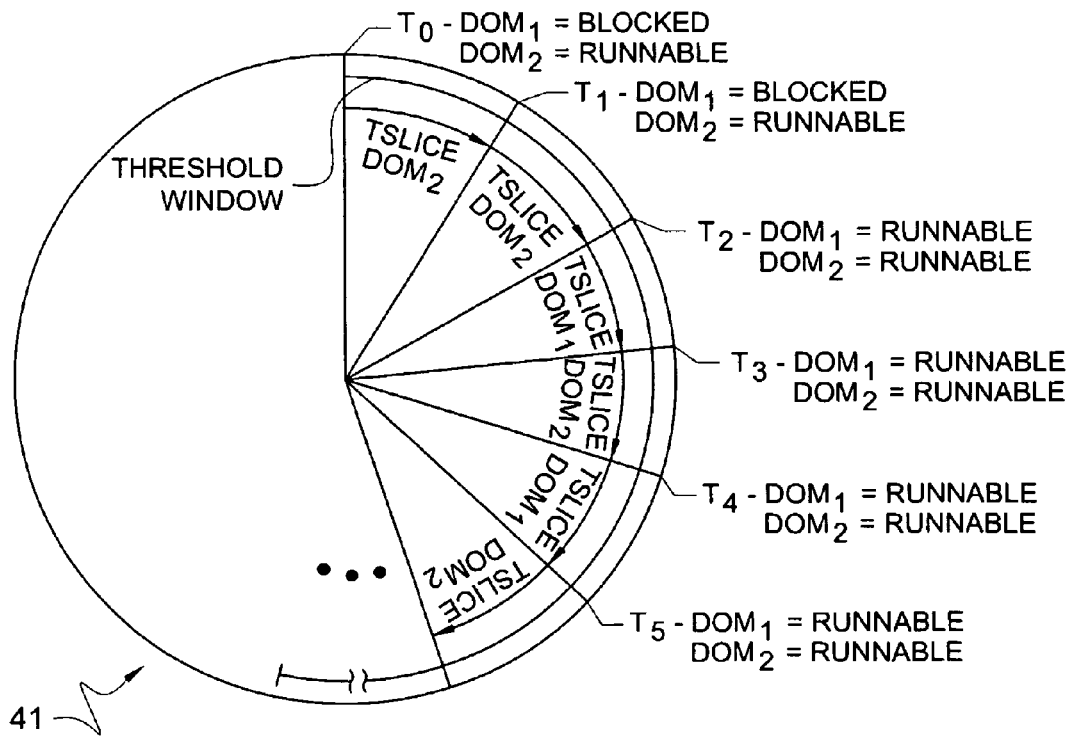
FIG. 4B shows a pie chart illustrating an exemplary scenario for scheduling performed by a modified BVT scheduler according to one embodiment of the present invention.

For example, FIG. 4B shows a pie chart 41 illustrating an exemplary scenario for scheduling performed by a modified BVT scheduler according to one embodiment of the present invention. Again, the illustrated example assumes C=0. As with the exemplary scenario described above with FIG. 4A, two competing consumers $Dom_1$ and $Dom_2$ are present, which have the same weight and thus are entitled to the same share of CPU allocation over time. Also, as with the exemplary scenario of FIG. 4A, $Dom_1$ is a blocked-intensive consumer (e.g., I/O-intensive consumer), while $Dom_2$ is a processor usage-intensive consumer (e.g., CPU usage-intensive consumer). In the example shown in FIG. 4B, at time $T_0$ $Dom_1$ is blocked and $Dom_2$ is runnable. In this example, at time $T_0$ the actual virtual time $A_1$ of $Dom_1$ is $A_1=T_0$, and the actual virtual time $A_2$ of $Dom_2$ is $A_2=T_0$. The modified BVT scheduler of one embodiment of the present invention schedules $T_{slice}$ (e.g., 100 microseconds) to $Dom_1$.

At time $T_1$, $Dom_1$ remains blocked and $Dom_2$ remains runnable. Thus, the modified BVT scheduler of this exemplary embodiment schedules another $T_{slice}$ (e.g., 100 microseconds) to $Dom_1$. At time $T_2$, domain $Dom_1$ has become unblocked. However, in this exemplary embodiment, a threshold time window (e.g., 1 second) has been defined, and the modified BVT scheduler does not update $Dom_1$'s actual virtual time if it was not blocked for longer than the defined threshold time window. In the example shown, $Dom_1$ was not blocked for longer than the defined threshold time window, and thus its actual virtual time is not updated. If, on the other hand, $Dom_1$ was blocked for longer than the defined threshold time window, then the modified BVT scheduler of one embodiment updates $Dom_1$'s actual virtual time according to equations (2) and (3) above.

Because, in the example shown, $Dom_1$ was not blocked for longer than the defined threshold time window, and thus its actual virtual time is not updated, the scheduler maintains proportionality between $Dom_1$ and $Dom_2$ in its scheduling of CPU access. For instance, in this example, the scheduler schedules $T_{slice}$ intervals of access from $T_2$ to $T_3$ and from $T_3$ to $T_4$ for $Dom_1$. This brings the scheduled time for $Dom_1$ back in proportion to that of $Dom_2$. Thereafter, the modified BVT scheduler schedules proportional shares (e.g., equal time slices in this example since the domains have equal weights) to each of $Dom_1$ and $Dom_2$.

In order to optimize CPU allocation and scheduling of I/O-intensive domains in the presence of CPU usage-intensive domains, certain embodiments of the present invention enable an additional QoS desire for domain CPU allocation to be specified (e.g., at a user-level). For example, according to one embodiment of the present invention, a time interval $Block_i$ (in real time units) may be defined that specifies for how long domain $Dom_i$ can be blocked (e.g., sleep) without causing its avt time $A_i$ to be updated. In other words, if domain $Dom_i$ has been blocked in time $T_{bl}$ and becomes runnable at time $T_{cur}$, one embodiment of the present invention distinguishes two different cases:

1) if $T_{cur}-T_{bl} \leq Block_i$, then avt time $A_i(T_{cur})$ is not adjusted and $A_i(T_{cur})=A_i(T_{bl})$; and
2) if $T_{cur}-T_{bl} > Block_i$, then avt time $A_i$ is adjusted as $A_i(T_{cur})=\max(A_i(T_{bl}), SVT)$.

Additionally, as described further below, in certain embodiments the definition of SVT is also modified from that of the classic BVT scheduling algorithm.

Further, in certain embodiments, a time interval Credit (in real time units) is defined that specifies for how long back a guest domain can have its actual virtual time lagging. In other words, such Credit specifies a time interval during which the guest domain can potentially accumulate the CPU share credit by not adjusting its actual virtual time after wakeup. In certain embodiments, a user may input the values of $Block_i$- and/or Credit to be used by the scheduler in scheduling access to CPU for a given domain $Dom_i$.

Since system virtual time SVT and domain's actual virtual time avt are based on virtual time units, an embodiment of the present invention keeps a correspondence between time interval Credit in real time and some corresponding virtual time. To achieve this goal, the scheduler keeps a moving window of n samples in real time, where each sample reflects a corresponding minimum virtual time of runnable domains at that time. This moving window may be implemented as a ring buffer with values for virtual time sampled every real-time time interval with duration defined as Credit/n. Thus, at any moment $T_{cur}$, there exists a ring buffer of n virtual time samples: $AVT\_sample_1, \ldots, AVT\_sample_i, \ldots, AVT\_sample_n$ that correspond to real time points $T_1, \ldots, T_i, \ldots T_n$, where $T_1$ represents the closest time stamp in this buffer for $T_{cur}$-Credit and $T_i=T_{i-1}$-Credit/n.

Using this n time samples back in time according to the specified time interval Credit, one embodiment of the present invention defines $SVT(T_{cur})=AVT\_sample_1$, i.e. system virtual time is allowed to lag behind to a virtual time that was minimum amount of the running domains time interval Credit ago. In other words: $SVT=\min(A_i(T_{cur}-Credit))$ such that $Dom_i$ is runnable at time $T_{cur}$-Credit.

Figure 5:
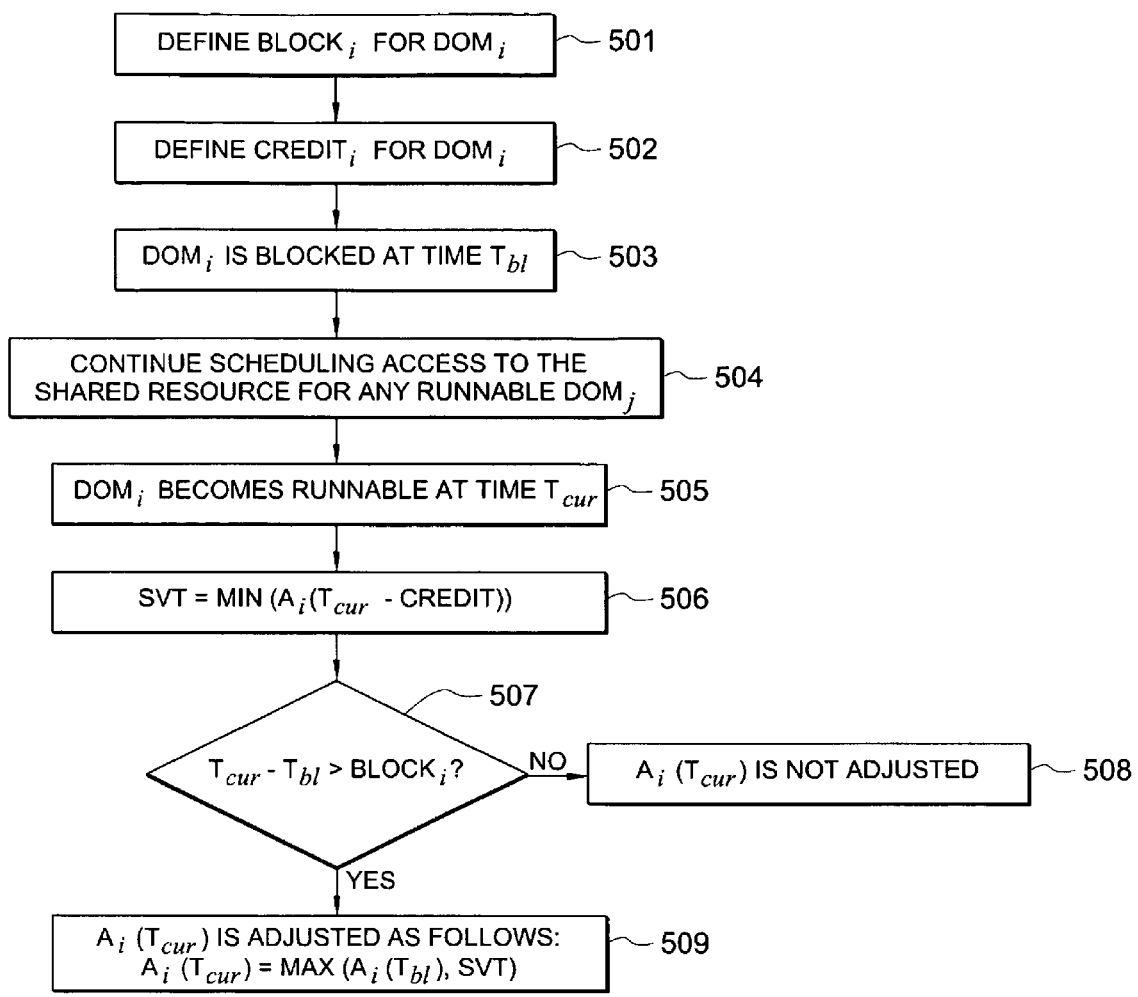
FIG. 5 shows an exemplary operational flow of a modified (or "optimized") BVT scheduler according to one embodiment of the present invention.

Thus, FIG. 5 shows an exemplary operational flow of a modified (or "optimized") BVT scheduler according to one embodiment of the present invention. In operational block 501, a time interval Block$_i$ (in real time units) is defined that specifies for how long a domain Dom$_i$ can be blocked (e.g., sleep) without causing its avt time A$_i$ to be updated. In operational block 502, a time interval Credit (in real time units) is defined that specifies for how long back Dom$_i$ can have its actual virtual time lagging. In operational block 503, Dom$_i$ is blocked at time T$_{bl}$. In operational block 504, the scheduler continues scheduling access to the shared processor resource (e.g., CPU) for any runnable (non-blocked) domains, Dom$_j$, while domain Dom$_i$ is blocked. In operational block 505, Dom$_i$ becomes runnable (i.e., it is unblocked).

In operational block 506, the system virtual time SVT is updated as: SVT=min(A$_i$(T$_{cur}$−Credit)), such that Dom$_i$ is runnable at time T$_{cur}$−Credit. In operational block 507, the scheduler determines whether T$_{cur}$-T$_{bl}$>Block$_i$. If not, then the actual virtual time A$_i$(T$_{cur}$) of the Dom$_i$ is not adjusted in block 508. Rather, the scheduler schedules resource access for Dom$_i$ to bring its access back in proportion with the other domains, i.e. to make up for the time during which Dom$_i$ was blocked and the other runnable domain(s) stole a disproportionate amount of resource access (e.g., in block 504). If, on the other hand, the scheduler determines at operational block 507 that T$_{cur}$-T$_{bl}$ is greater than Block$_i$, then the actual virtual time A$_i$(T$_{cur}$) of the Dom$_i$ is adjusted in block 509 as: A$_i$(T$_{cur}$)=max(A$_i$(T$_{bl}$),SVT).

Figure 6:
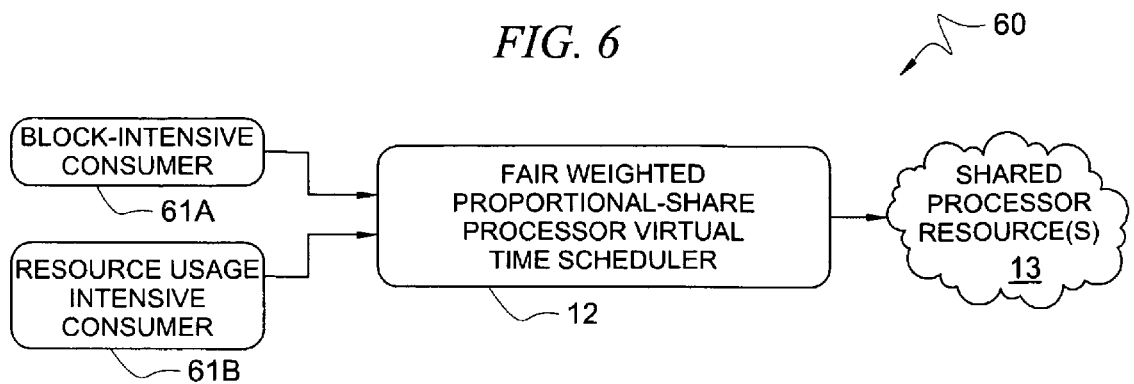
FIG. 6 shows an exemplary system in which an embodiment of the present invention may be employed.
Figure 7:
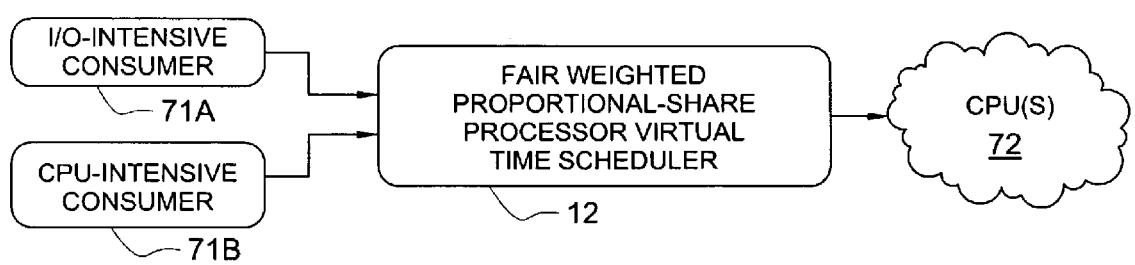
FIG. 7 shows another exemplary system in which an embodiment of the present invention may be employed.

While many of the examples provided herein describe a scheduler for use in scheduling CPU access for domains, embodiments of the present invention may be employed for scheduling access to any shared processor resource for any consumers. As one example, FIG. 6 shows an exemplary system 60 according to one embodiment of the present invention, wherein fair weighted proportional-share virtual time processor scheduler 12 schedules access to shared resource(s) 13 for a blocked-intensive consumer 61A and a processor usage-intensive consumer 61B. In certain embodiments, the shared processor resource(s) 13 comprise CPU, the blocked-intensive consumer 61A is an I/O-intensive consumer, and the processor usage-intensive consumer 61B is a CPU usage-intensive consumer. Thus, for example, FIG. 7 shows another exemplary system 70 according to an embodiment of the present invention, wherein fair weighted proportional-share virtual time processor scheduler 12 schedules access to shared CPU(s) 72 for an I/O-intensive consumer 71A and a CPU usage-intensive consumer 71B.

Figure 8:
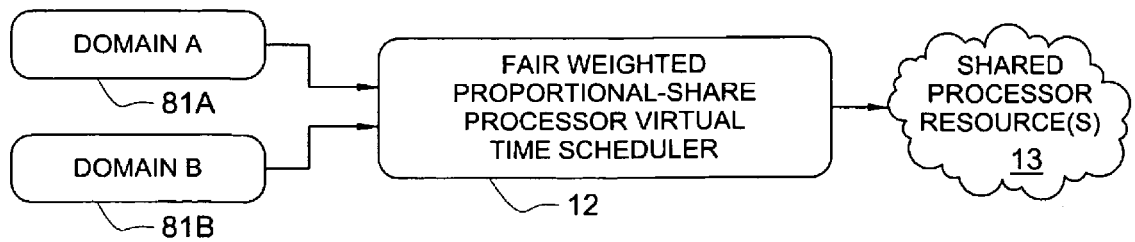
FIG. 8 shows another exemplary system in which an embodiment of the present invention may be employed.

In certain embodiments, as mentioned above, the consumers are virtual machines (or "domains"). For example, FIG. 8 shows another exemplary system 80 according to an embodiment of the present invention, wherein fair weighted proportional-share virtual time processor scheduler 12 schedules access to shared processor resource(s) 13 for a first domain 81A and a second domain 81B.

As an exemplary case study for the above-described modified BVT scheduler, we designed a set of simple performance experiments, where Dom$_1$ performs a disk read of 1 GB file; and
Dom$_i$(1<i≦8) are running CPU usage-intensive task (e.g., a "CPU hog application"). In this exemplary case study, all the domains (Dom$_0$, Dom$_1$, ..., Dom$_8$) are allocated equal share by the scheduler (i.e., they have equal weights). In this exemplary case study, we performed 8 experiments described as follows:

Experiment 1: Only Dom$_0$ and Dom$_1$ are running. Dom$_0$ hosts a disk driver. Dom$_1$ performs a disk read of 1 GB file, and there are not any other competing tasks.

Experiment i (1<i≦8): There are i domains running in the system. Dom$_0$ hosts a disk driver. Dom$_1$ performs a disk read of 1 GB file, and Dom$_i$ (1<i≦8) are running a CPU usage-intensive task (referred to as "CPU hog application").

Figure 9A:
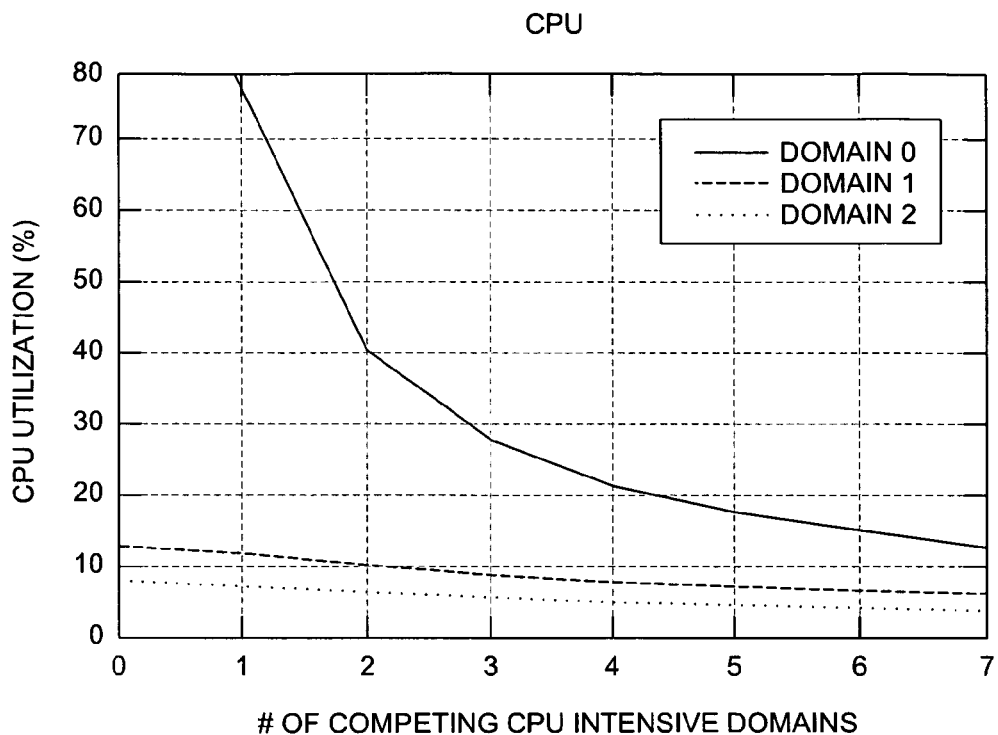
FIG. 9A shows CPU utilization of domains $Dom_0$, $Dom_1$ and $Dom_2$ across eight experiments under the classic BVT scheduler for an exemplary case study.

FIG. 9A shows CPU utilization of Dom$_0$, Dom$_1$ and Dom$_2$ across eight experiments under the classic BVT scheduler for this exemplary case study. FIG. 9A demonstrates that Dom$_0$ and Dom$_1$ both have a very limited CPU consumption since Dom$_1$ executes a disk read that is an I/O-intensive application, and Dom$_0$ hosts disk driver and performs I/O processing on behalf of Dom$_1$. The interesting trend is that under increasing number of competing CPU-intensive domains, CPU utilization of Dom$_0$ and Dom$_1$ is decreasing while still not being able to "consume" their share. This example demonstrates the "stolen" CPU share by CPU-intensive domains in the classic BVT scheduler described above.

Figure 9B:
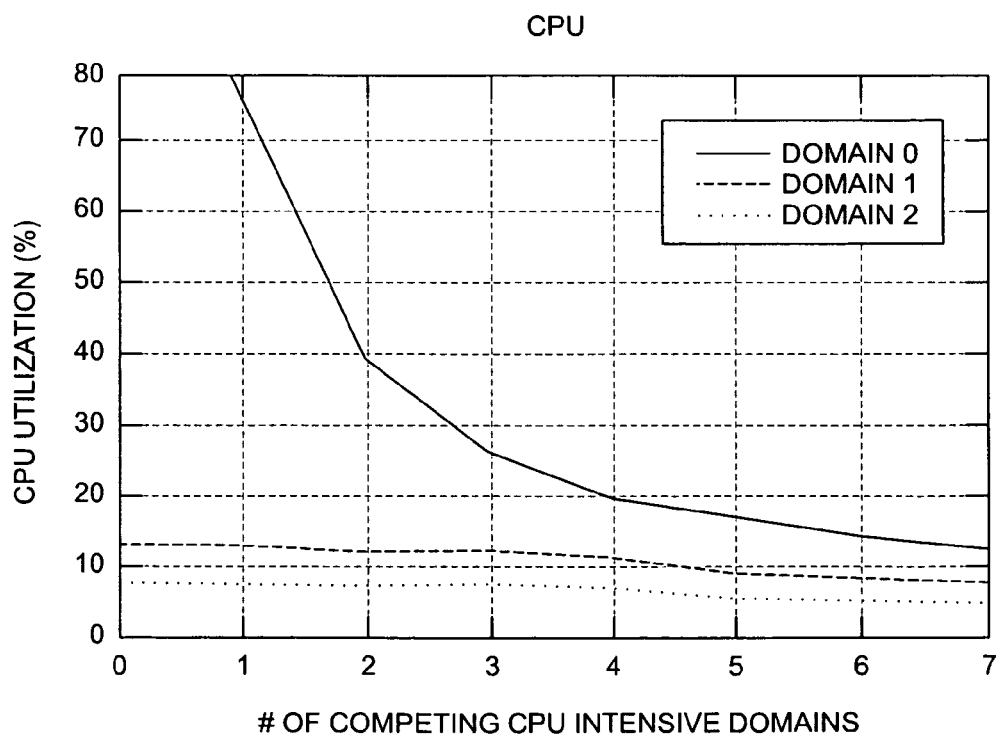
FIG. 9B shows CPU utilization of domains $Dom_0$, $Dom_1$ and $Dom_2$ across eight experiments in a case study for a BVT scheduler optimized according to one embodiment of the present invention.
Figure 10A:
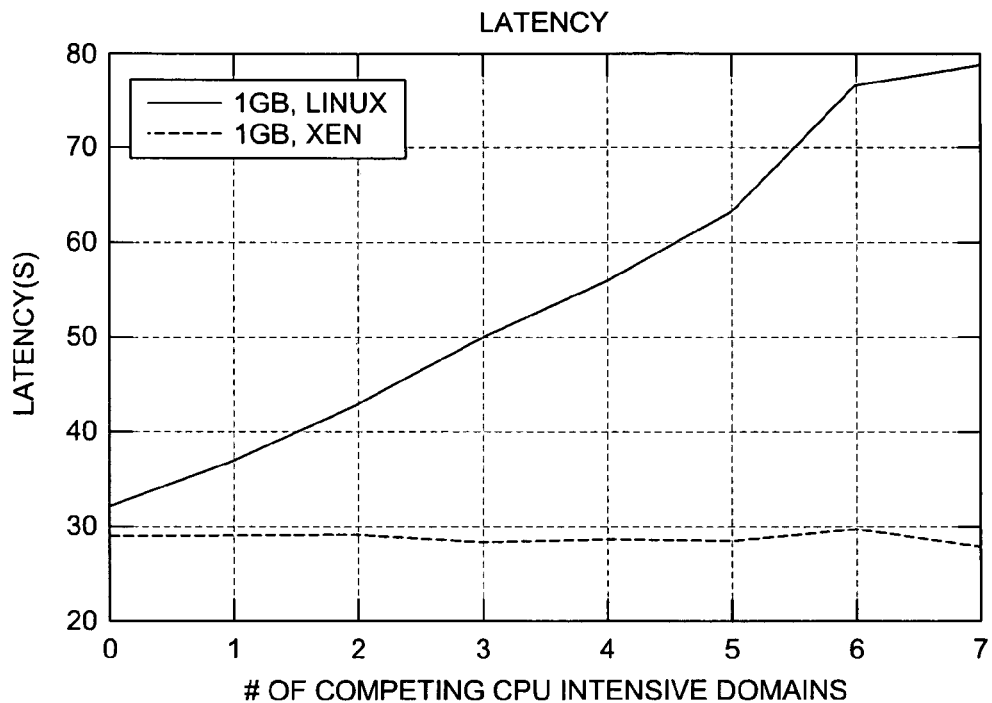
FIG. 10A shows disk read latency across eight experiments of an exemplary case study under the classic BVT scheduler.
Figure 10B:
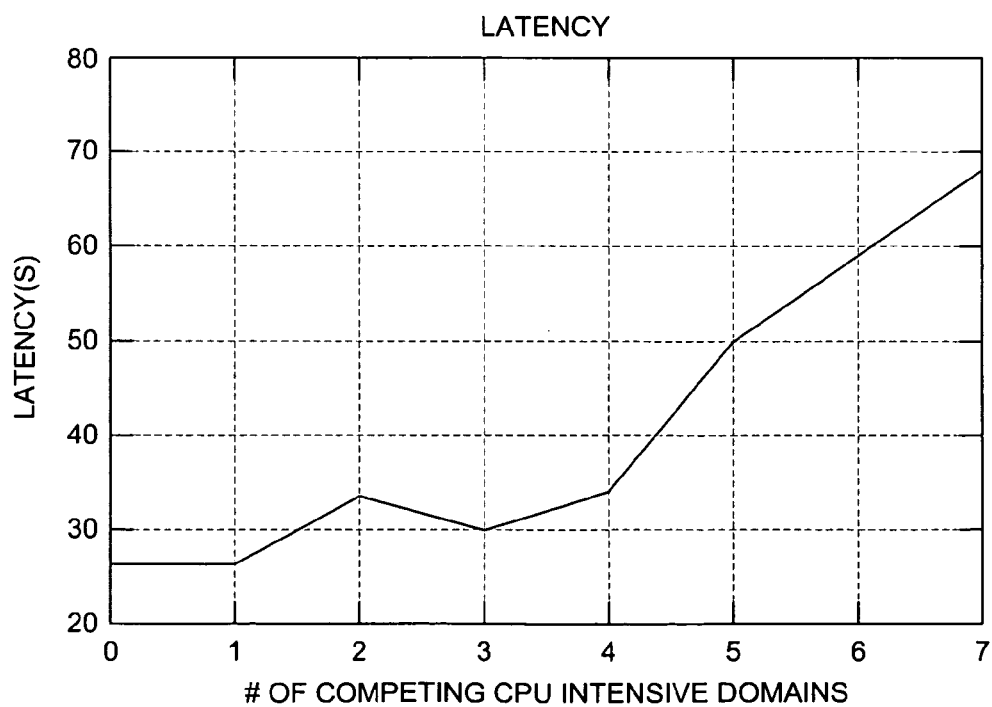
FIG. 10B shows disk read latency across eight experiments of an exemplary case study under the BVT scheduler optimized according to one embodiment of the present invention.

FIG. 9B shows CPU utilization of Dom$_0$, Dom$_1$ and Dom$_2$ across eight experiments for a BVT scheduler optimized according to the above exemplary embodiment of the present invention described with FIG. 5. FIG. 9B clearly shows, that Dom$_0$ has been able to regain about 20-25% of additional CPU utilization compared with CPU utilization of Dom$_0$ under the classic BVT scheduler shown in FIG. 9A, thus improving fairness of the scheduler. This regained CPU share has a critical impact for latency of this 1 GB file disk read. FIG. 10A shows disk read latency across the above 8 experiments of this exemplary case study under the classic BVT scheduler. FIG. 10B shows disk read latency across the 8 experiments of this exemplary case study under the BVT scheduler optimized according to the above exemplary embodiment of the present invention described with FIG. 5. As shown, the optimized BVT scheduler of the embodiment of FIG. 5 provides up to 30% latency improvement for 1 GB file disk read for this exemplary case study.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 11:
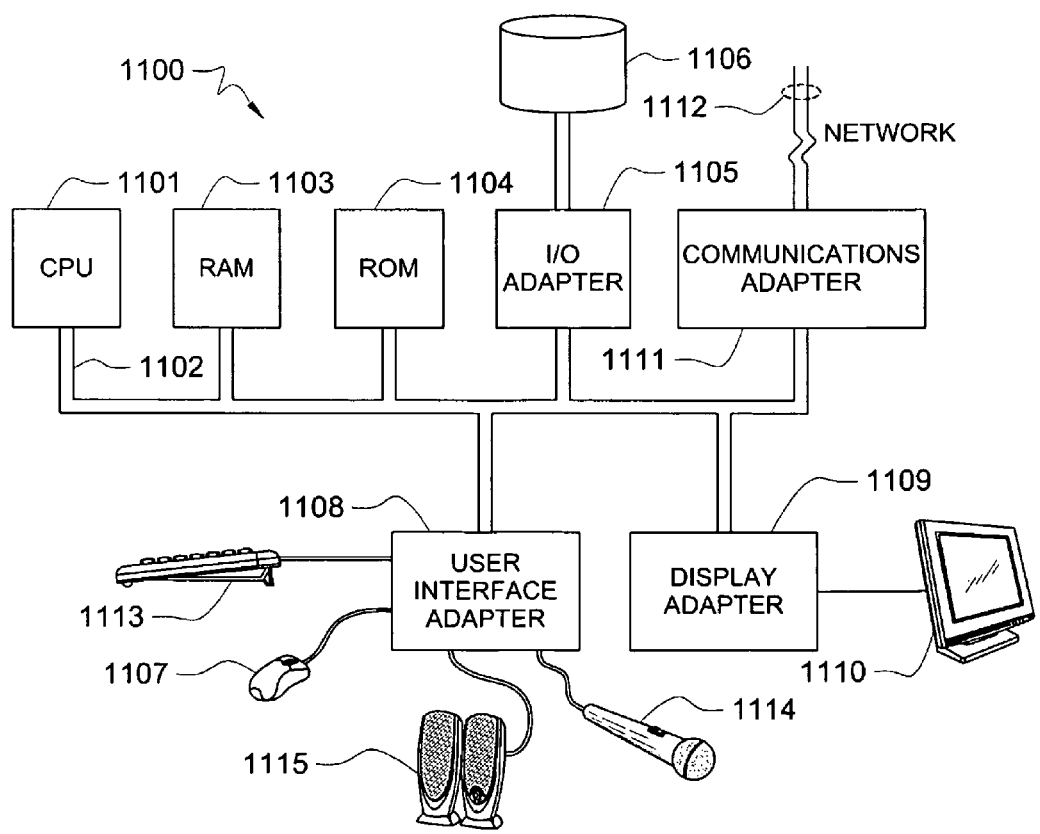
FIG. 11 shows an exemplary system on which a scheduler, consumers, and/or resources may be implemented according to embodiments of the present invention.

FIG. 11 illustrates an exemplary computer system 1100 on which the scheduler 12, consumers (e.g., domains), and processor resources may be implemented according to one embodiment of the present invention. Central processing unit (CPU) 1101 is coupled to system bus 1102. CPU 1101 may be any general purpose CPU. The present invention is not restricted by the architecture of CPU 1101 (or other components of exemplary system 1100) as long as CPU 1101 (and other components of system 1100) supports the inventive operations as described herein. CPU 1101 may execute the various logical instructions according to embodiments of the present invention. For example, CPU 1101 may execute machine-level instructions according to the exemplary operational flows described above in conjunction with FIGS. 2, 3, and 5.

Computer system 1100 also preferably includes random access memory (RAM) 1103, which may be SRAM, DRAM, SDRAM, or the like. Computer system 1100 preferably includes read-only memory (ROM) 1104 which may be PROM, EPROM, EEPROM, or the like. RAM 1103 and ROM 1104 hold user and system data and programs, as is well known in the art.

Computer system 1100 also preferably includes input/output (I/O) adapter 1105, communications adapter 1111, user interface adapter 1108, and display adapter 1109. I/O adapter 1105, user interface adapter 1108, and/or communications adapter 1111 may, in certain embodiments, enable a user to interact with computer system 1100 in order to input information, such as the above-described $Block_i$, Credit, and/or other parameters defining QoS desires for a given consumer i.

I/O adapter 1105 preferably connects to storage device(s) 1106, such as one or more of hard drive, compact disc (CD) drive, floppy disk drive, tape drive, etc. to computer system 1100. The storage devices may be utilized when RAM 1103 is insufficient for the memory requirements associated with storing data for operations of the scheduler and/or consumers. Communications adapter 1111 is preferably adapted to couple computer system 1100 to network 1112, which may enable information to be input to and/or output from system 1100 via such network 1112 (e.g., the Internet or other wide-area network, a local-area network, a public or private switched telephony network, a wireless network, any combination of the foregoing). User interface adapter 1108 couples user input devices, such as keyboard 1113, pointing device 1107, and microphone 1114 and/or output devices, such as speaker(s) 1115 to computer system 1100. Display adapter 1109 is driven by CPU 1101 to control the display on display device 1110 to, for example, display information to a user.

It shall be appreciated that the present invention is not limited to the architecture of system 1100. For example, any suitable processor-based device may be utilized for implementing scheduler 12, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method comprising:
    scheduling, by a weighted proportional-share virtual time processor scheduler, processor access to a first consumer during a time period in which a second consumer is blocked from processor access, comprising:
        defining a block time interval $Block_i$, wherein the block time interval specifies how long the second consumer can be blocked from processor access without causing the second consumer's actual virtual time $A_i$ to be updated upon becoming unblocked; and
        defining a credit time interval Credit, wherein the credit time interval specifies how long back the second consumer can have its actual virtual time $A_i$ lagging, wherein the second consumer becomes blocked from processor access at time $T_{bl}$, and wherein the weighted proportional-share virtual time processor scheduler continues scheduling access to the processor for the first consumer while the second consumer is blocked; and when the second consumer becomes unblocked, the system virtual time SVT is updated as: $SVT=\min(A_i(T_{cur}\text{-Credit}))$, wherein $T_{cur}$ is a current time of the second consumer, the second consumer is unblocked at time $T_{cur}$-Credit, and $\min(A_i(T_{cur}\text{-}$ Credit)) is a minimum actual virtual time of the second consumer at time $T_{cur}$-Credit;
        when the second consumer becomes unblocked from processor access, determining, by the weighted proportional-share virtual time processor scheduler, whether length of the time period over which the second consumer was blocked from processor access exceeds a predefined time threshold, comprising:
            determining whether $T_{cur}\text{-}T_{bl}$ is greater than the block time interval $Block_i$, and when determined that $T_{cur}\text{-}T_{bl}$ is not greater than the block time interval $Block_i$, not updating the actual virtual time $A_i(T_{cur})$ of the first consumer at time $T_{cur}$ before scheduling access to the processor for the first consumer; and
            when determined that $T_{cur}\text{-}T_{bl}$ is greater than the block time interval $Block_i$, then the actual virtual time $A_i(T_{cur})$ of the first consumer at time $T_{cur}$ is adjusted as: $A_i(T_{cur})=\max(A_i(T_{bl}),SVT)$, wherein $A_i(T_{cur})$ equals either the SVT or the actual virtual time of the first consumer at $T_{bl}$, whichever is greater; and
        when determined that the length of the time period over which the second consumer was blocked from processor access does not exceed the predefined time threshold, not updating virtual time of the second consumer before scheduling processor access for the second consumer.

2. The method of claim 1 further comprising:
    when determined that the length of the time period over which the second consumer was blocked from processor access exceeds the predefined time threshold, updating virtual time of the second consumer before scheduling processor access for the second consumer.

3. The method of claim 1 wherein said not updating virtual time of the second consumer comprises:
    not updating virtual time of the second consumer to current system virtual time before scheduling processor access for the second consumer.

4. The method of claim 1 wherein the weighted proportional-share virtual time processor scheduler schedules processor access to consumers in time slices, and wherein the predefined time threshold is longer than a time slice.

5. The method of claim 1 wherein the first consumer comprises a first virtual machine, and wherein the second consumer comprises a second virtual machine.

6. The method of claim 1 wherein the first and second consumers each comprise a software application.

7. The method of claim 1 wherein the first consumer comprises a processor usage-intensive consumer, and wherein the second consumer comprises a blocked-intensive consumer.

8. The method of claim 1 wherein the second consumer was blocked from processor access by an input/output (I/O) interrupt.

9. Computer-executable software code stored on a non-transitory computer-readable medium, the code implementing a weighted proportional-share virtual time processor scheduler, wherein the code comprises:
    code for defining a block time interval $Block_i$ that specifies for how long a first consumer can be blocked from processor access without causing the first consumer's actual virtual time $A_i$ to be updated upon becoming unblocked;
    code for defining a credit time interval Credit that specifies for how long back the first consumer can have its actual virtual time $A_i$ lagging;
    code, responsive to the first consumer becoming blocked from processor access at time $T_{bl}$, for updating system virtual time SVT as: $SVT=\min(A_i(T_{cur}\text{-Credit}))$, wherein $T_{cur}$ is a current time of the first consumer, the first consumer is unblocked at time $T_{cur}$-Credit, and min($A_i(T_{cur}$-Credit)) is a minimum actual virtual time of the consumer at time $T_{cur}$-Credit;

code, responsive to the first consumer becoming unblocked, for determining whether $T_{cur}$-$T_{bl}$ is greater than the block time interval Block$_i$;

code, when determined that $T_{cur}$-$T_{bl}$ is not greater than the block time interval Block$_i$, for not updating the actual virtual time $A_i(T_{cur})$ of the first consumer at time $T_{cur}$ before scheduling access to the processor for the first consumer; and code, when determined that $T_{cur}$-$T_{bl}$ is greater than the block time interval Block$_i$, for updating the actual virtual time $A_i(T_{cur})$ of the first consumer as:

$A_i(T_{cur})$=max($A_i(T_{bl})$,SVT), wherein $A_i(T_{cur})$ equals either the SVT or the actual virtual time of the consumer at $T_{bl}$, whichever is greater.

10. The computer-executable software code of claim 9 further comprising:

code for scheduling processor access for a second runnable consumer while the first consumer is blocked from processor access.

11. The computer-executable software code of claim 9 wherein the weighted proportional-share virtual time processor scheduler comprises a borrowed virtual time (BVT) scheduler.

12. The computer-executable software code of claim 9 wherein the first consumer comprises a virtual machine.

13. The computer-executable software code of claim 9 further comprising:

code for scheduling processor access in time slices, wherein the block time interval Block$_i$ is greater than a time slice.

14. A system comprising:

at least one processor; and a weighted proportional-share virtual time processor scheduler for scheduling access to the at least one processor by competing consumers, including a first and a second consumer, wherein the scheduling includes:

defining a block time interval Block$_i$, wherein the block time interval specifies how long the second consumer can be blocked from processor access without causing the second consumer's actual virtual time $A_i$ to be updated upon becoming unblocked; and defining a credit time interval Credit, wherein the credit time interval specifies how long back the second consumer can have its actual virtual time $A_i$ lagging, wherein the second consumer becomes blocked from processor access at time $T_{bl}$, and wherein the weighted proportional-share virtual time processor scheduler continues scheduling access to the processor for the first consumer while the second consumer is blocked; and when the second consumer becomes unblocked, the system virtual time SVT is updated as: SVT=min($A_i(T_{cur}$-Credit)), wherein $T_{cur}$ is a current time of the second consumer, the second consumer is unblocked at time T $T_{cur}$-Credit, and min($A_i(T_{cur}$-Credit)) is a minimum actual virtual time of the second consumer at time $T_{cur}$-Credit;

wherein the weighted proportional-share virtual time processor scheduler defines a length of a time window during which if the second consumer becomes blocked from processor access and unblocked from said processor access, then the actual virtual time of the first consumer is not updated before scheduling processor access for the first consumer, such that when $T_{cur}$-$T_{bl}$ is not greater than the block time interval Block$_i$, the actual virtual time $A_i(T_{cur})$ of the first consumer at time $T_{cur}$ is not updated before scheduling access to the processor for the first consumer.

15. The system of claim 14 wherein when a consumer becomes blocked from processor access and unblocked from said processor access after a length of time that exceeds the length of the time window, then virtual time of the consumer is updated by the weighted proportional-share virtual time processor scheduler before scheduling processor access for the consumer.

16. The system of claim 14 wherein the weighted proportional-share virtual time processor scheduler comprises a borrowed virtual time (BVT) scheduler.

17. The system of claim 14 wherein the at least one processor comprises at least one central processor unit (CPU).

* * * * *

UNITED STATES PATENT AND TRADEMARK OFFICE
CERTIFICATE OF CORRECTION

| | | |
|---|---|---|
| PATENT NO. | : 8,255,910 B2 | Page 1 of 1 |
| APPLICATION NO. | : 11/488399 | |
| DATED | : August 28, 2012 | |
| INVENTOR(S) | : Ludmila Cherkasova et al. | |

It is certified that error appears in the above-identified patent and that said Letters Patent is hereby corrected as shown below:

In the Claims:

In column 16, line 15, in Claim 14, after "at time" delete "T".

Signed and Sealed this
Fourth Day of June, 2013

Teresa Stanek Rea
*Acting Director of the United States Patent and Trademark Office*